United States Patent [19]

Bond et al.

[11] 4,128,383
[45] Dec. 5, 1978

[54] APPARATUS FOR CONTROLLING PLASTIC MATERIAL DISTRIBUTION IN MANUFACTURE OF BIAXIALLY ORIENTED PLASTIC CONTAINERS

[75] Inventors: Thomas J. Bond, Chardon; William J. Kelly, Brunswick; Richard C. Adams, Chardon, all of Ohio

[73] Assignee: The Standard Oil Company, Cleveland, Ohio

[21] Appl. No.: 844,255

[22] Filed: Oct. 21, 1977

Related U.S. Application Data

[63] Continuation-in-part of Ser. No. 689,166, May 24, 1976, abandoned, which is a continuation-in-part of Ser. No. 612,015, Sep. 10, 1975, abandoned.

[51] Int. Cl.² .............................................. B29D 23/03
[52] U.S. Cl. ..................................... 425/529; 425/535
[58] Field of Search ............... 425/529, 535, 457, 468, 425/469; 264/94, 97

[56] References Cited

U.S. PATENT DOCUMENTS

| | | | |
|---|---|---|---|
| 3,222,725 | 12/1965 | Smith | 425/449 |
| 3,342,914 | 9/1967 | Edwards | 425/444 X |
| 3,587,133 | 6/1971 | Valyi | 425/526 |
| 4,047,869 | 9/1977 | Mulvany, Jr. | 425/529 |

FOREIGN PATENT DOCUMENTS 47-3906  3/1972  Japan ....................................... 425/529

Primary Examiner—Richard B. Lazarus
Attorney, Agent, or Firm—John F. Jones; Larry W. Evans

[57] ABSTRACT

An improved apparatus which allows for uniform axial stretch rate and careful temperature control in the production of biaxially oriented plastic containers having uniform wall thickness and good clarity.

3 Claims, 4 Drawing Figures

APPARATUS FOR CONTROLLING PLASTIC MATERIAL DISTRIBUTION IN MANUFACTURE OF BIAXIALLY ORIENTED PLASTIC CONTAINERS

This is a continuation-in-part application of our co-pending patent application Ser. No. 689,166 filed May 24, 1976, which is a continuation-in-part of application Ser. No. 612,015 filed Sept. 10, 1975, both now abandoned.

This invention relates to an apparatus for carefully controlling the distribution of plastic material in the manufacture of biaxially oriented thermoplastic containers, and more particularly relates to a blow molding apparatus which allows for uniform stretch rate and careful temperature control which permits the production of biaxially oriented thermoplastic containers having uniform wall thickness and excellent clarity.

It is an object of this invention to provide an apparatus which produces thermoplastic containers having a high degree of biaxial orientation.

It is also an object to provide biaxially oriented thermoplastic containers having improved performance properties by utilization of lower orientation temperatures.

Another object is the provision of thermoplastic containers having improved plastic material distribution in the base thereof.

Another object is the provision of a plastics molding apparatus which gives higher axial stretch ratios because of carefully controlled stretch rates. The accomplishment of these and other objects will become apparent from the following.

This invention relates to four major improvements in a stretch-blow orientation apparatus of prior art. The improvements allow lower orientation temperatures and higher axial stretch ratios which produce biaxial oriented bottles with a very high degree of orientation resulting in excellent bottle performance at lower material weight—namely, (1) controlled axial stretch by a spring-loaded mandrel, (2) controlled radial stretch by gas orifices in the mandrel, (3) orientation of material in the base through use of a low heat-transfer material in the tip, and (4) heaters in the base of the mold allowing lower orientation temperature without stress whitening of the molded product.

In the accompanying drawings, an embodiment of this invention appears wherein.

Figure 1:
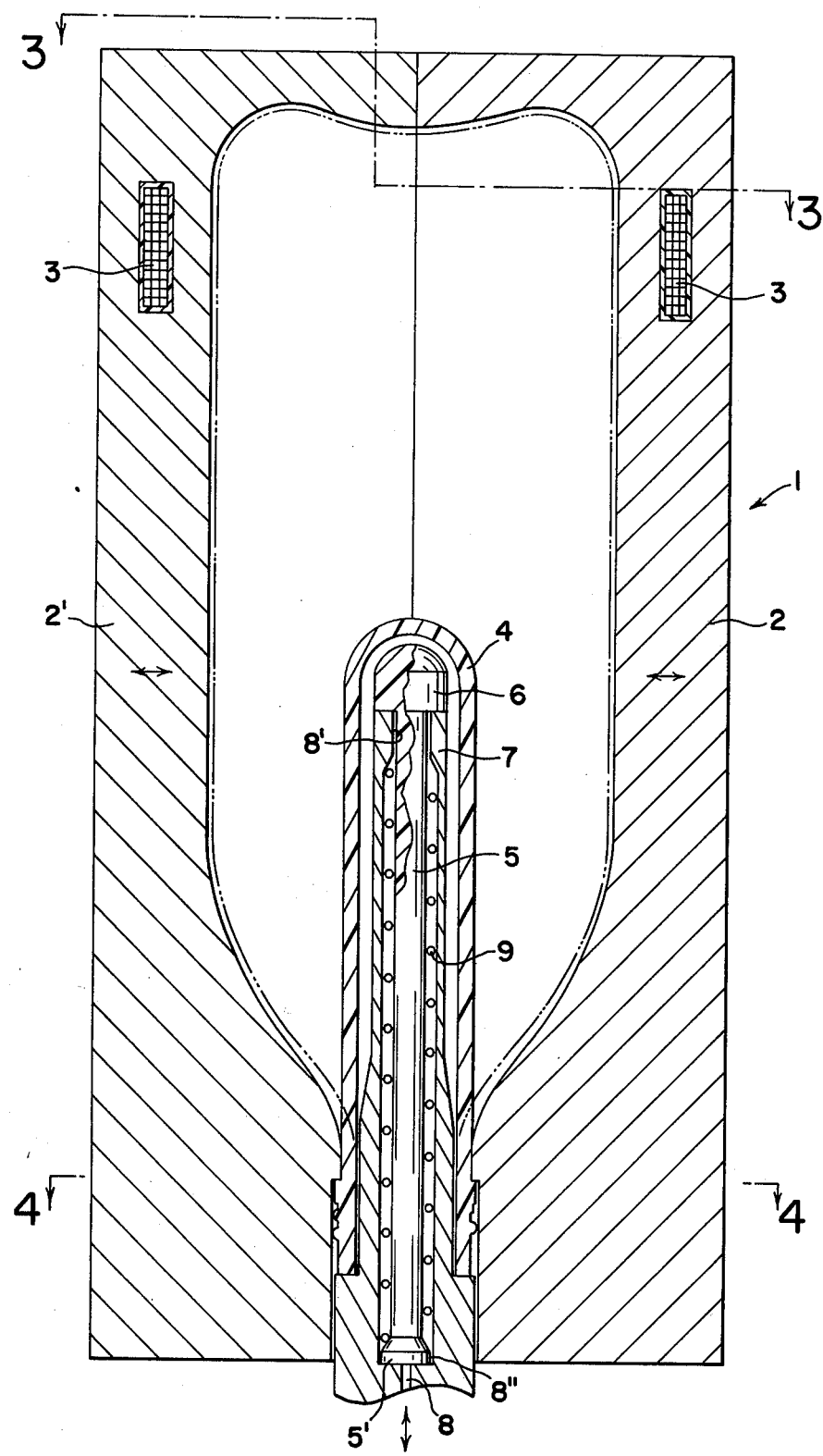
FIG. 1 is a side sectional elevational view of the molding apparatus. The mold in this particular embodiment is for a bottle in inverted position.
Figure 2:
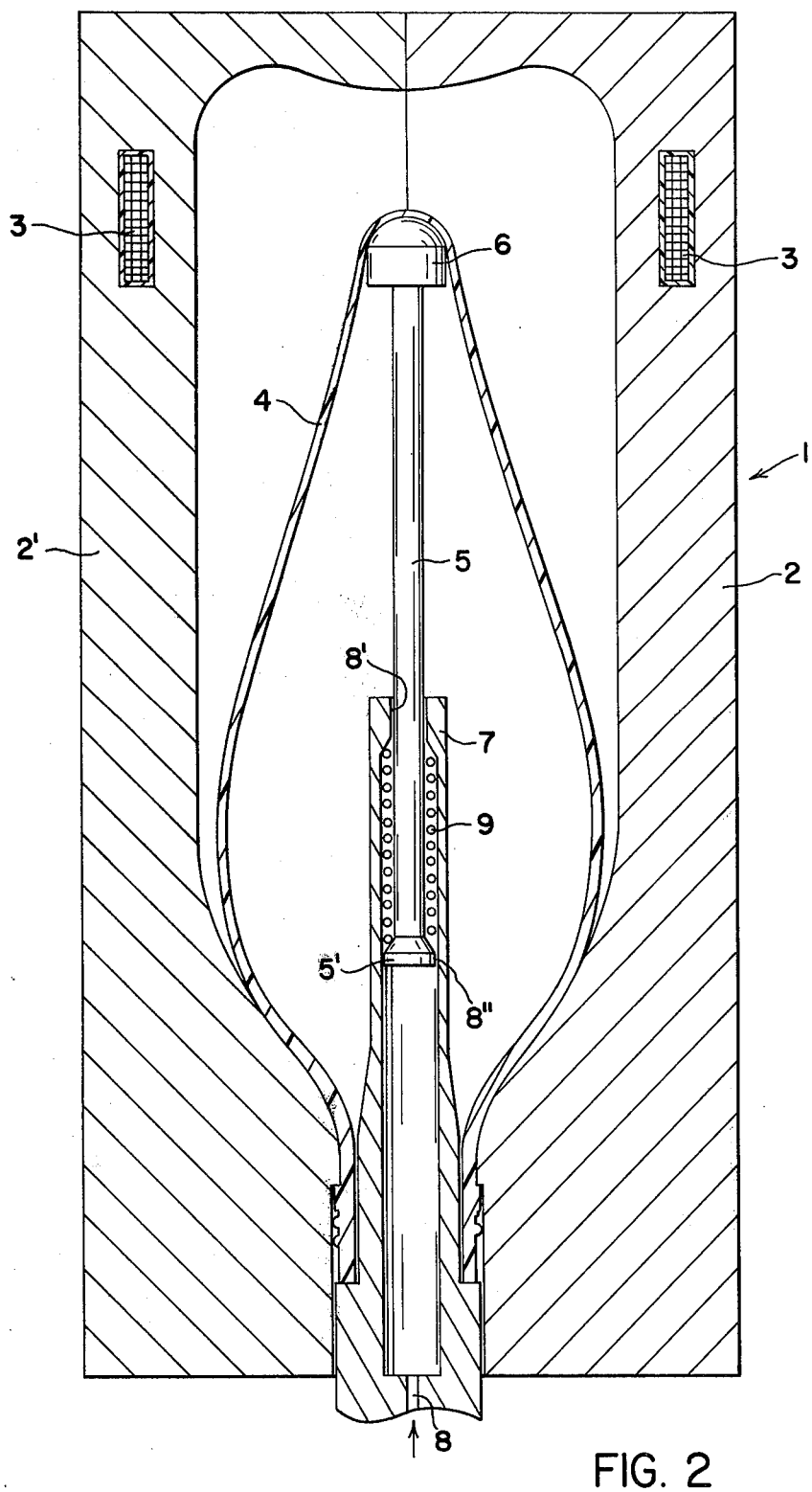
FIG. 2 is another side elevation in section of the mold apparatus showing the thermoplastic partially inflated within the mold.
Figure 3:
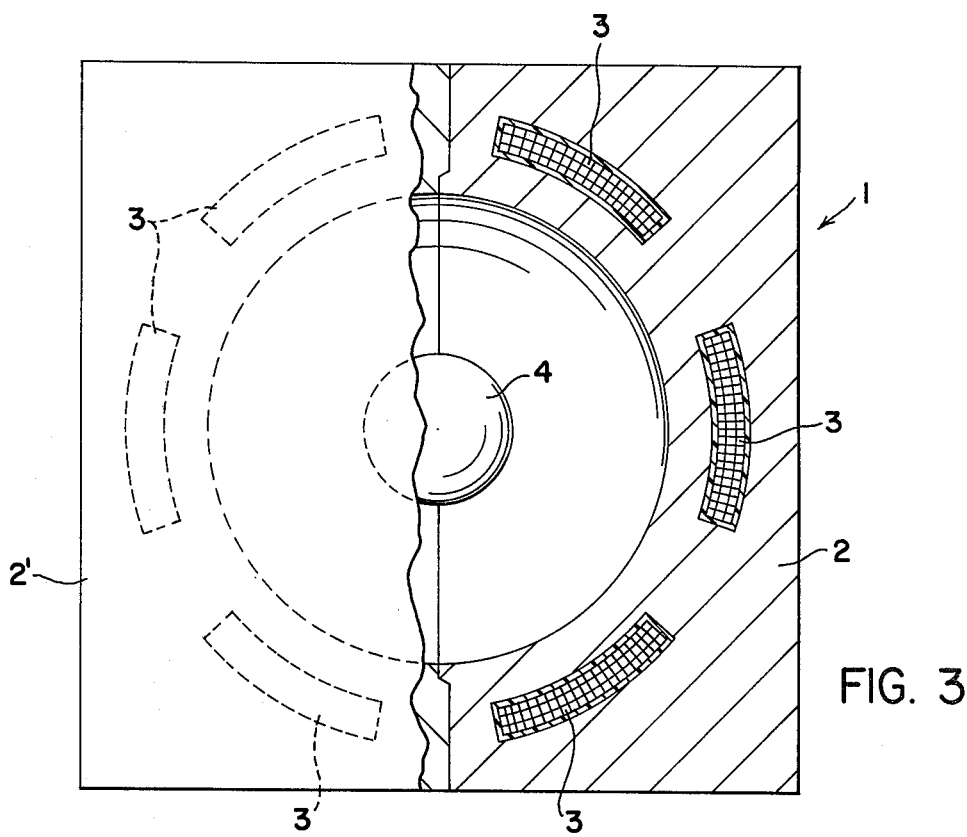
FIG. 3 is a view taken along line 3—3 in FIG. 1.
Figure 4:
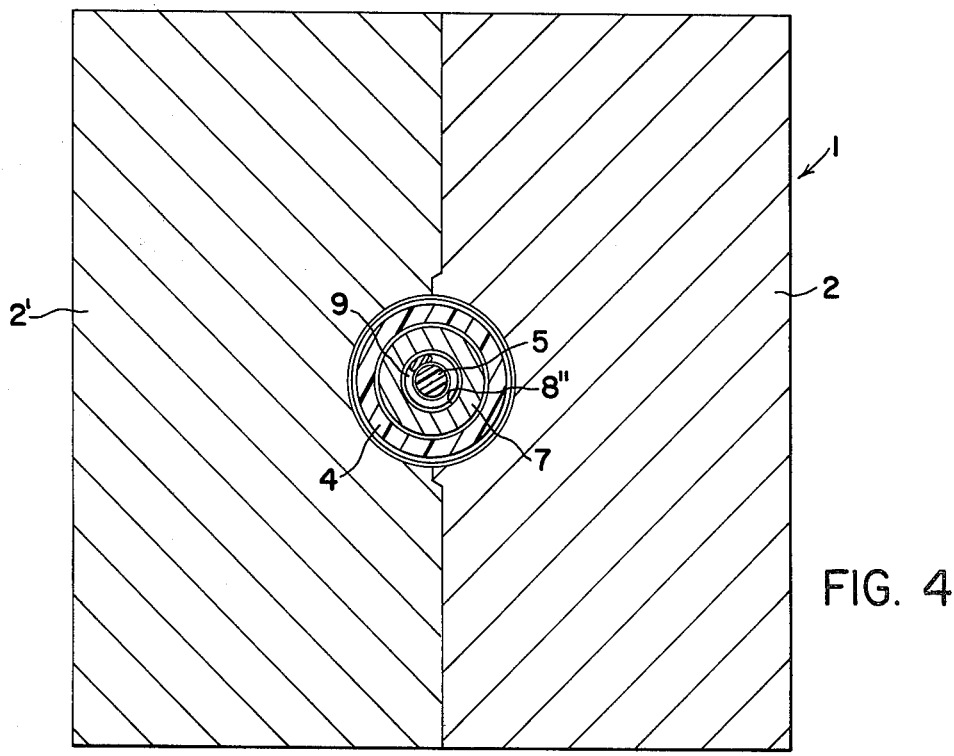
FIG. 4 is a view taken along line 4—4 in FIG. 1.

The molding apparatus 1 is composed of two hollow mold halves 2 and 2' which are equipped with cartridge heaters 3 which can be located at intervals of from 6 to 60 degrees apart along the circumference of the mold 1. Within the mold there is positioned a thermoplastic parison or preform 4 which has been preheated to the desired orientation temperature for the thermoplastic. The stretch-blow mandrel 7 contains a blow pin 5 having an enlarged lower end 5' that functions as a piston and is movable in the vertical direction inside the stretch-blow mandrel 7. The tip 6 of the blow pin is made from a low heat-transfer coefficient material such as Teflon, nylon, polyester, transite, and the like. The stretch-blow mandrel 7 has an inlet port 8 that supplies pressurized fluid which acts against piston 5' and moves the blow pin 5 vertically, axially stretching the preform 4 as shown in FIG. 2. Simultaneously, the pressurized fluid is in communication with the inside walls of the preform 4 through the annular orifices 8' and 8" which control the rate of preform inflation or radial preform stretch. The rate of vertical movement of the blow pin is controlled by a compression spring 9. Spring 9 becomes compressed as the blow pin 5 moves upward and the compressed spring length is sized such that it allows the blow pin tip 6 to approach the top of the inside of the cavity of the mold 1 but not to push the upper center part of the expanded preform 4 against the top portion of the cavity of mold 1.

The apparatus of the present invention is useful in the manufacture of biaxially oriented containers from orientable thermoplastic materials such as polypropylene, polystyrene, polyvinyl chlorides, polyesters, and particularly thermoplastic nitrile-gas barrier resins including those described in U.S. Pat. Nos. 3,426,102, 3,451,538, 3,586,737, 3,763,278 and 3,821,348. The production of clear, biaxially oriented bottles from nitrile-gas barrier resins which have rather narrow orientation ranges is readily accomplished in the apparatus of this invention.

By means of the apparatus of this invention, biaxially oriented thermoplastic containers can be produced with improved control of plastic material distribution throughout the walls of the containers, and a high degree of orientation is obtained in the base of the container by employing materials which have low heat-transfer coefficients in construction of the tip 6 of the orientation blow pin 5. Materials such as Teflon, nylon, polyester, transite, and the like, can be used for the tip 6 to reduce the heat loss from the preform 4 to the tip 6 and blow pin 5, thus allowing more and better stretch of the preform 4 in the area of the tip 6 before the thermoplastic material in the expanded preform 4 drops below the orientation temperature of the thermoplastic material. Use of this apparatus allows for use of lower orientation temperatures which requires less energy and produces a higher degree of orientation in the molded article, and better utilization of the thermoplastic material in the base of the preform and higher performance of the base portion of the finished oriented container in terms of creep resistance and drop-impact resistance, and requires less plastic material than normal in this area of the container which results in a reduction in weight of thermoplastic material needed for the container.

In controlling the rate of axial stretch of the preform 4, better control over thermoplastic material distribution in the vertical walls of the oriented container can be obtained at lower orientation temperatures with the apparatus of this invention. Control of the axial stretch of a thermoplastic preform is obtained by the spring loading of the longitudinal stretch device or blow pin 5. By varying the spring 9 constant and length of spring 9 or using a spring 9 which has a variable spring constant, different rates of stretch can be obtained for a given stretch distance. This improvement over existing art combines with the insulated blow pin tip 6 to markedly improve the orientation and thermoplastic material distribution in the base of the container. The spring 9 will slow and stop the blow pin 5 before it reaches the bottom of the cavity of the finished container mold 1, keeping the thermoplastic material from dropping below orientation temperature by preventing the thermoplastic in the tip area from contacting the wall of the cool mold at this point before the preform has been fully inflated. This allows the blowing fluid pressure to stretch the thermoplastic material in the preform near the base of the container over the entire area of the base giving improved distribution of plastic material and increased orientation in the base of the container.

Because the heated thermoplastic preform is not instantaneously expanded into the form of the interior of the container mold 1, orientation stress whitening can occur when thermoplastics having narrow orientation temperature ranges (5°-15° F) are used in the manufacture of biaxially oriented thermoplastic containers. Orientation stress whitening can be eliminated using the apparatus of the present invention by an increase in the surface temperature of the mold cavity in the areas where either high stretch is experienced or in areas where the thermoplastic material fills the mold cavity last. Stress whitening is eliminated by not allowing the last part of the plastic preform to fill the mold and fall below the orientation temperature. The careful control of the temperature of selected areas on the surface of the mold cavity is accomplished using electric low-watt density cartridge heaters or zoned temperature-controlled fluid in the mold areas where stress whitening ordinarily occurs. By eliminating stress whitening, a container of uniform clarity is obtained, and improved thermoplastic material distribution is obtained in the areas of the mold cavity surface where stress whitening normally occurs.

EXAMPLE

In an apparatus like that described in the drawings and specification above, a biaxially oriented bottle was prepared from a thermoplastic nitrile rubber-modified copolymer of about 75% acrylonitrile and 25% methyl acrylate (Barex ® 210 resin marketed by Vistron Corporation). The mold halves each contained 3 electric cartridge heaters. The heaters were equally spaced radially about the mold and each was of a 50-watt capacity and ¼ inch by 1 inch long. The heaters were located 1 inch from the top of the blow-mold cavity as shown in the drawings (bottom of the bottle).

An injection-molded plastic preform was installed on the stretch-blow mandrel. The preform was heated by radiant heat to about 220° F. on the mandrel before it was placed in the mold cavity and stretch-blow molded. the preform had the following dimensions:

| | |
|---|---|
| neck finish | 28 mm. |
| neck finish, I.D. | .730 inch |
| body, O.D. | .982 inch |
| wall thickness | .120 inch |
| overall length | 6.5 inches |
| Body of preform had a 1-degree draft angle. | |

The blowing mandrel had an O.D. in the neck finish which provided a push fit between the preform and the mandrel. The relaxed length of the stretch-blow mandrel was designed so that the blow pin tip did not quite contact the inside of the preform. The mold halves (blow cavity for a 32-ounce round bottle with screw neck bottle having a body diameter of 3.14 inches and an overall height of 10.75 inches with a 28-mm. neck finish) were closed around the mandrel and preform and the blow-air supply was connected to the port 8, and the biaxial orientation process was started. The pressure of the blow air was programmed so that it was at 200 psig for ½ second and at 180 psig for 9 seconds. When the blow air was thus applied to the port, both axial stretching and radial blowing as shown in FIG. 2 occurred simultaneously. Air through orifices 8' and 8" was used to adjust or fine tune the radial stretch rate of the container. The upward stroke of the blow pin was somewhat retarded by the stretch-control spring. The blow pin had the following characteristics:

| | |
|---|---|
| blow-pin piston diameter | .547 inch |
| mandrel inside diameter | .551 inch |
| orifice area (8") | .003 inch$^2$ |
| orifice area (8') | .0005 inch$^2$ |
| control spring (9) | 10 coil, 1.45 inches long spring constant 2.838 pounds per inch |
| tip (6) | Teflon |

A highly oriented bottle having excellent clarity and no stress whitening was produced.

We claim:

1. In a blow molding apparatus useful for the production of biaxially oriented hollow thermoplastic containers from thermoplastic preforms, said apparatus being composed of a hollow mold and means for positioning said thermoplastic preform within the cavity of said mold and means for preheating said preform to the orientation temperature and means for stretching and expanding said preform against the walls of the mold cavity, the improvements comprising a stretch-blow mandrel which has an axis and movable blow pin with tip, said blow pin having means responsive to fluid pressure to cause it to move axially to stretch the parison and spring means for controlling the rate of axial movement of the blow pin and for limiting the axial movement of the blow pin so that the blow pin tip cannot force the walls of said preform against the wall of the cavity of the mold, means for controlling the rate of fluid flow through the orifices, said blow pin tip being of an insulating material which reduces the heat loss from the thermoplastic preform to the blow pin tip, mold heating means for preventing the thermoplastic preform material from dropping below orientation temperatures in the last areas to expand into the mold cavity.

2. The apparatus of claim 1 wherein the blow pin tip is constructed of a low heat-transfer material selected from a group consisting of Teflon, nylon, polyester and transite.

3. The apparatus of claim 2 wherein the mold heating means are zone temperature controls.

* * * * *